(12) United States Patent
Itou et al.

(10) Patent No.: US 8,347,009 B2
(45) Date of Patent: Jan. 1, 2013

(54) COMMUNICATION SYSTEM HAVING A PLURALITY OF COMMUNICATION NODES

(75) Inventors: Akito Itou, Kariya (JP); Yuu Kimoto, Anjo (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 12/846,083

(22) Filed: Jul. 29, 2010

(65) Prior Publication Data

US 2011/0029704 A1 Feb. 3, 2011

(30) Foreign Application Priority Data

Jul. 29, 2009 (JP) ................................ 2009-176477

(51) Int. Cl.
*G06F 13/368* (2006.01)

(52) U.S. Cl. ........ 710/121; 710/110; 710/119; 370/447; 370/461; 370/462

(58) Field of Classification Search .......... 710/110–125; 370/216, 241, 330, 342, 390, 432, 444, 447, 370/451, 461, 462

See application file for complete search history.

(56) References Cited

U.S. PATENT DOCUMENTS

| | | | | |
|---|---|---|---|---|
| 4,560,985 A | * | 12/1985 | Strecker et al. | 370/447 |
| 5,088,024 A | * | 2/1992 | Vernon et al. | 710/111 |
| 5,151,994 A | * | 9/1992 | Wille et al. | 710/116 |
| 5,229,652 A | * | 7/1993 | Hough | 307/104 |
| 5,455,466 A | * | 10/1995 | Parks et al. | 307/104 |
| 5,488,817 A | * | 2/1996 | Paquet et al. | 56/10.2 R |
| 5,754,803 A | * | 5/1998 | Regis | 710/119 |
| 5,854,454 A | * | 12/1998 | Upender et al. | 187/247 |
| 5,862,226 A | * | 1/1999 | Cervini | 381/2 |
| 6,111,888 A | * | 8/2000 | Green et al. | 370/461 |
| 6,559,783 B1 | * | 5/2003 | Stoneking | 341/141 |
| 6,609,172 B1 | * | 8/2003 | Stringham | 710/305 |
| 6,654,833 B1 | * | 11/2003 | LaBerge | 710/107 |
| 6,697,350 B2 | * | 2/2004 | Lomp | 370/342 |
| 6,831,551 B2 | * | 12/2004 | Davenport et al. | 370/447 |
| 6,842,808 B2 | * | 1/2005 | Weigl et al. | 710/117 |
| 6,845,416 B1 | * | 1/2005 | Chasmawala et al. | 710/107 |
| 6,967,937 B1 | * | 11/2005 | Gormley | 370/330 |

(Continued)

FOREIGN PATENT DOCUMENTS

JP H03-116351 5/1991

(Continued)

OTHER PUBLICATIONS

Corrigan, Steve. Introduction to the Controller Area Network (CAN). Application Report. Texas Instruments. Jul. 2008.*

(Continued)

*Primary Examiner* — Matthew D Spittle
(74) *Attorney, Agent, or Firm* — Nixon & Vanderhye PC (57) ABSTRACT

A certain ECU transmits a reference message for requiring the other ECUs to transmit data. After transmission of the reference message, each of all the ECUs transmits priority information of its transmit message onto a communication bus, and then detects whether some priority information transmitted from the other ECUs has a higher priority than its own transmitted priority information. If there is detected no priority information of a higher priority than its own transmitted priority information, it transmits a message associated therewith, and then is prohibited to transmit data of the same priority until receiving a next reference message.

18 Claims, 10 Drawing Sheets

U.S. PATENT DOCUMENTS

| | | | |
|---|---|---|---|
| 6,985,981 B1 * | 1/2006 | Hauck et al. | 710/107 |
| 7,009,969 B1 * | 3/2006 | Parrish et al. | 370/390 |
| 7,072,380 B2 * | 7/2006 | Ozluturk et al. | 375/141 |
| 7,075,898 B2 * | 7/2006 | Weigl et al. | 370/257 |
| 7,096,295 B2 * | 8/2006 | Hartwich | 710/260 |
| 7,103,646 B1 | 9/2006 | Suzuki | |
| 7,107,473 B2 * | 9/2006 | Fuehrer et al. | 713/400 |
| 7,171,579 B2 * | 1/2007 | Weigl et al. | 713/600 |
| 7,188,162 B1 | 3/2007 | Fredriksson et al. | |
| 7,376,961 B2 * | 5/2008 | Goodman et al. | 720/632 |
| 7,428,608 B2 * | 9/2008 | Yakashiro | 710/116 |
| 7,454,170 B2 * | 11/2008 | Goossens et al. | 455/41.1 |
| 7,466,717 B1 * | 12/2008 | Weigl et al. | 370/451 |
| 7,685,345 B2 * | 3/2010 | Dunn et al. | 710/244 |
| 7,706,398 B2 * | 4/2010 | Jung et al. | 370/447 |
| 7,769,932 B2 * | 8/2010 | Nichols | 710/107 |
| 7,792,199 B2 * | 9/2010 | Kodama et al. | 375/260 |
| 7,986,729 B2 * | 7/2011 | Kennedy et al. | 375/239 |
| 2005/0015521 A1 | 1/2005 | Hartwich | |
| 2005/0254518 A1 | 11/2005 | Fujimori | |
| 2006/0171410 A1 * | 8/2006 | Jung et al. | 370/447 |
| 2007/0286225 A1 | 12/2007 | Enders et al. | |
| 2009/0240857 A1 | 9/2009 | Hartwich | |

FOREIGN PATENT DOCUMENTS

| | | |
|---|---|---|
| JP | 08-223190 | 8/1996 |
| JP | 2000-99481 | 4/2000 |
| JP | 2000-509530 | 7/2000 |
| JP | 2002-084298 | 3/2002 |
| JP | 2002-261779 | 9/2002 |
| JP | 2004-528759 | 9/2004 |
| JP | 2004-535091 | 11/2004 |
| JP | 2005-502970 | 1/2005 |
| JP | 2005-328119 | 11/2005 |
| JP | 2006-287738 | 10/2006 |
| JP | 2006-319394 | 11/2006 |
| JP | 2007-174053 | 7/2007 |
| JP | 2007-523576 | 8/2007 |
| JP | 2008-504725 | 2/2008 |
| JP | 2008-049976 | 3/2008 |
| JP | 4224100 | 11/2008 |

OTHER PUBLICATIONS

Shah et al. An Introduction to TTCAN. Mar. 7, 2002.*
Albert et al. Migration from CAN to TTCAN for a Distributed Control System. CAN in Automation. 2003.*
Albert et al. Heuristic Scheduling Concepts for TTCAN networks. CAN in Automation. 2005.*
Bosch. Time Triggered CAN (TTCAN). 1st TTCAN Workshop. Mar. 2001.*
Abstract of International Organization for Standardization "Road vehicles—Controller area network (CAN)—Part 4: Time-triggered communication", ISO 11898-4:2004, 1 page.
Abstract of International Organization for Standardization, "Road vehicles—Controller area network (CAN)—Part I: Data link layer and physical signaling", ISO 11898-1:2003, 1 page.

* cited by examiner

COMMUNICATION SYSTEM HAVING A PLURALITY OF COMMUNICATION NODES

CROSS-REFERENCE TO RELATED APPLICATION

This application is based on and claims the benefit of priority from earlier Japanese Patent Application No. 2009-176477 filed Jul. 29, 2009, the description of which is incorporated herein by reference.

BACKGROUND

1. Technical Field

The present invention relates to a communication system having a plurality of communication nodes connected to a communication bus.

2. Related Art

Known communication protocols, which are implemented in in-vehicle communication systems having a plurality of communication nodes connected to a communication bus, include:

CSMA/NBA such as Controller Area Network (CAN) compliant with ISO11898-1; and

Time Division Multiplex (TDM) based on fixed-length timeslots such as ISO11898-4 and FlexRay® (see e.g. Japanese Unexamined Patent Application Publication No. 2008-049976).

The CAN protocol arbitrates collision of communications by using identifiers (IDs). However, an increasing number of kinds of data transmitted onto a communication bus increase the arbitration frequency. Therefore, the problem encountered in such a case is that data having an identifier (ID) of a lower priority such that it loses the arbitration with a higher probability becomes more difficult to be transmitted (or sent-out).

On the other hand, since TDM based on fixed-length timeslots such as FlexRay®, transmits one piece of data in one timeslot and its timeslots are of a fixed length, the length of timeslots must be adjusted to the longest data length in advance. Therefore, the problem with such a protocol is that in case longer length data and shorter length data coexist, usage efficiency of a communication bus may be decreased.

BRIEF SUMMARY

In view of the above problems, it is an objective of the present exemplary embodiments to provide a communication system having a plurality of communication nodes connected to a communication bus, which is able to increase a transmission (or sending-out) frequency of such data that would have a lower priority and a lower transmission frequency in the conventional communication systems and improve usage efficiency of the bus.

According to one embodiment there is provided a communication system comprising a communication bus and a plurality of communication nodes connected to the bus, the nodes being able to detect data transmitted onto the bus and including a predetermined node called a master node and one or more nodes called specific nodes. The master node comprises means for transmitting a reference message for requiring the other nodes to transmit their own transmit data. Each of the specific nodes comprises means for upon having received the reference message from the master node, transmitting priority information indicative of a priority of its own transmit data onto the bus and means for detecting whether some priority information transmitted by the other nodes indicates a higher priority than its own transmitted priority information.

Each of the specific nodes further comprises means for if there is detected no priority information transmitted by the other nodes indicative of a higher priority than its own transmitted priority information, transmitting its own corresponding transmit data onto the bus and then prohibiting itself from transmitting data of the same priority as its own transmitted data until receiving a next reference message from the master node and means for if there is detected some priority information transmitted by the other nodes indicative of a higher priority than its own transmitted priority information, retransmitting its own priority information onto the bus after the transmit data associated with the detected higher priority information has been transmitted from the corresponding other specific node.

In the communication system according to the above embodiment, the one or more specific nodes start data transmission responsive to the reference message received from the master node. And based on the priority information, only data of the highest priority will be transmitted onto the communication bus. Since each of the specific nodes is then prohibited to transmit data of the same priority as its own transmitted data until receiving the next reference message from the master node, each specific node will transmit data in descending order of priority.

Therefore, transmit data, even if it has a lower priority, will be transmitted after all the messages of a relatively higher priority have been transmitted. In addition, the communication system according to the above embodiment can continue communications with an optimal time interval between data transmissions.

Accordingly, the communication system according to the above embodiment is able to increase a transmission frequency of such data that would have a lower priority and a lower transmission frequency in the conventional communication systems and to improve usage efficiency of the bus.

It should be noted that the one or more specific nodes may include the master node. In other words, the master node may act as one of the specific nodes as defined above. And the plurality of the communication nodes may include a node which transmits data whether or not it has received the reference message.

DETAILED DESCRIPTION OF THE PREFERRED EMBODIMENTS

Figure 1:
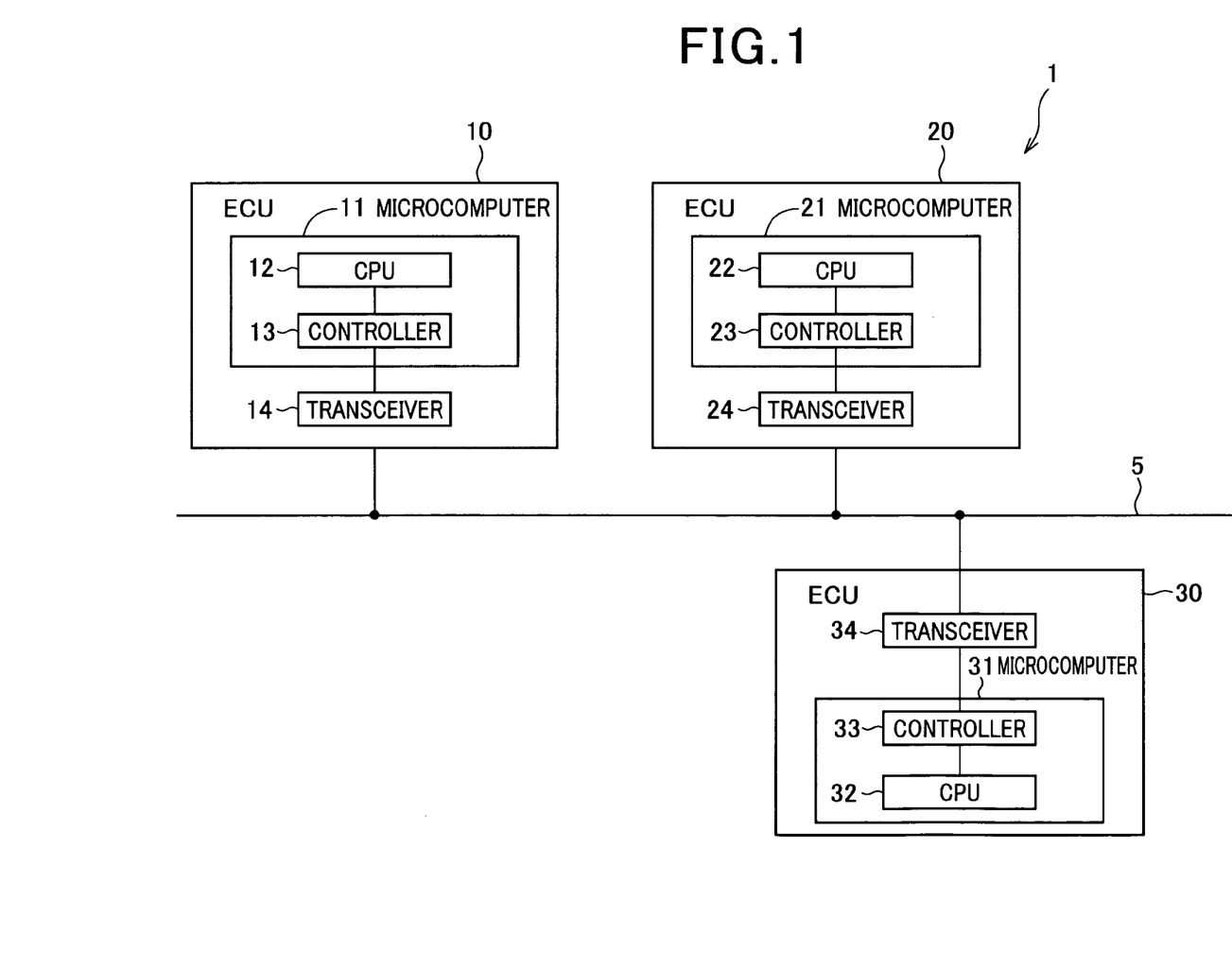
FIG. 1 is a block diagram that schematically illustrates a communication system according to an embodiment of the present invention.

In the following the present invention will be described by means of exemplary embodiments in connection with the accompanying drawings. FIG. 1 is a schematic block diagram of a communication system 1 in accordance with one exemplary embodiment of the present invention. The system 1 may be mounted on a vehicle such as an automobile. As shown in FIG. 1, a plurality of ECUs 10, 20 and 30 (denoted by ECUs 10-30 hereinafter) are connected to a communication bus 5. The number of ECUs connectable to the communication bus 5 is not limited to three, but may be four or more.

The ECUs 10-30 may have well-known hardware configuration to be able to implement communication with the CAN protocol compliant with ISO11898-1. And the ECUs 10-30 each may be of similar hardware configuration. Therefore, in the following, only the hardware configuration of the ECU 10 will be briefly described.

The ECU 10 includes a microcomputer 11 and a transceiver 14. The microcomputer 11 may be a well-known microcomputer including a CPU 12, RAM (not shown), ROM (not shown), and a controller 13.

The CPU 12 of the ECU 10 runs communications software stored in memory such as ROM to control the controller 13 and the transceiver 14. It further runs vehicle-control software to control various devices of the vehicle.

The ECU 10 transmits data to, and receives data from, other ECUs via the communication bus 5, using the transceiver 14. A communication protocol to be used then may be the CAN protocol or any other similar protocol. In particular, when the ECU 10 has a plurality of communication channels, each channel may be provided with a controller 10 and a transceiver 14. Also, the ECU 10 may implement vehicle-control in cooperation with the other ECUs by receiving data from, and transmitting data to, the other ECUs via the communication bus 5, or it may implement vehicle-control independently by directly inputting detection signals from various sensors without via the communication bus 5.

The transceiver 14 receives bus signals from the communication bus 5 at a receive terminal, and converts the bus signals into receive signals which the controller 13 can handle, and then outputs the converted signals to the controller 13. Also, the transceiver 14 converts transmit signals to be transmitted by the controller 13 into bus signals dedicated to the communication bus 5, and then transmits the converted signals to the communication bus 5 at a transmit terminal.

The controller 13 includes message boxes (not shown) and registers (not shown). The message boxes include, for example, a transmit message box and a receive message box both dedicated to pass data between the registers of the controller 13 and the CPU 12.

Each of the registers may be used to store data received from the transmit message box, or may be used to store data received from the transceiver 14. The controller 13 includes storage for storing programs and a processor operable to run the programs. The controller 13 is responsible for transmission control, reception control and arbitration control. In the transmission control process, the controller 13 successively stores transmit data received from the CPU 12 via the transmit message box (a transmit buffer) in a plurality of registers, and frames the transmit data stored in the registers and outputs the framed data to the transceiver 14. In the reception control process, the controller 13 receives frames from the communication bus 5 via the transceiver 14, and extracts messages or the like from the received frames, and successively stores the extracted messages in the plurality of registers, and then outputs the stored messages to the CPU 12 via the receive message box. In the arbitration control process, the controller 13 arbitrates potentially competing transmit frames over the communication bus 5.

During data transmission, the CPU 12 uses communications software to identify priority information ("ID Code") from content of a transmit message (i.e., a message to be sent out) and outputs this message and its corresponding priority information toward the transmit message box. Also, the CPU 12 reads the receive message box whenever getting informed of reception of a frame by the controller 13 through interrupt or indication of a flag.

In the above system 1, each of the ECUs 10, 20 and 30 commences data transmission responsive to (on the basis of) a reference message to be transmitted by a master node. In the following, for convenience of explanation, the ECU 10 is assumed to be a master node and the other ECUs 20 and 30 are each assumed to be a slave node.

Figure 2:
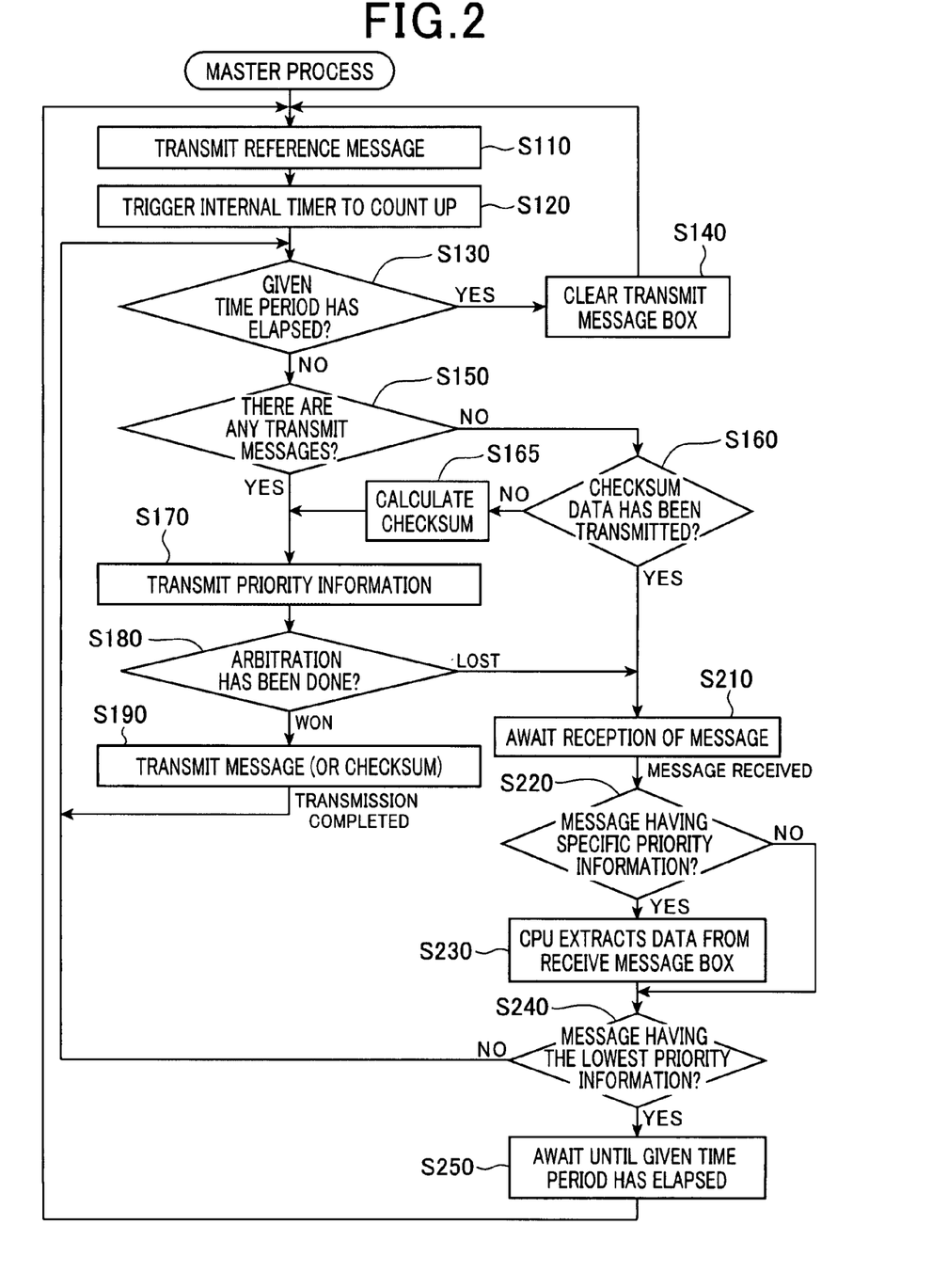
FIG. 2 is a flowchart that schematically illustrates a master process according to an embodiment of the present invention.
Figure 3:
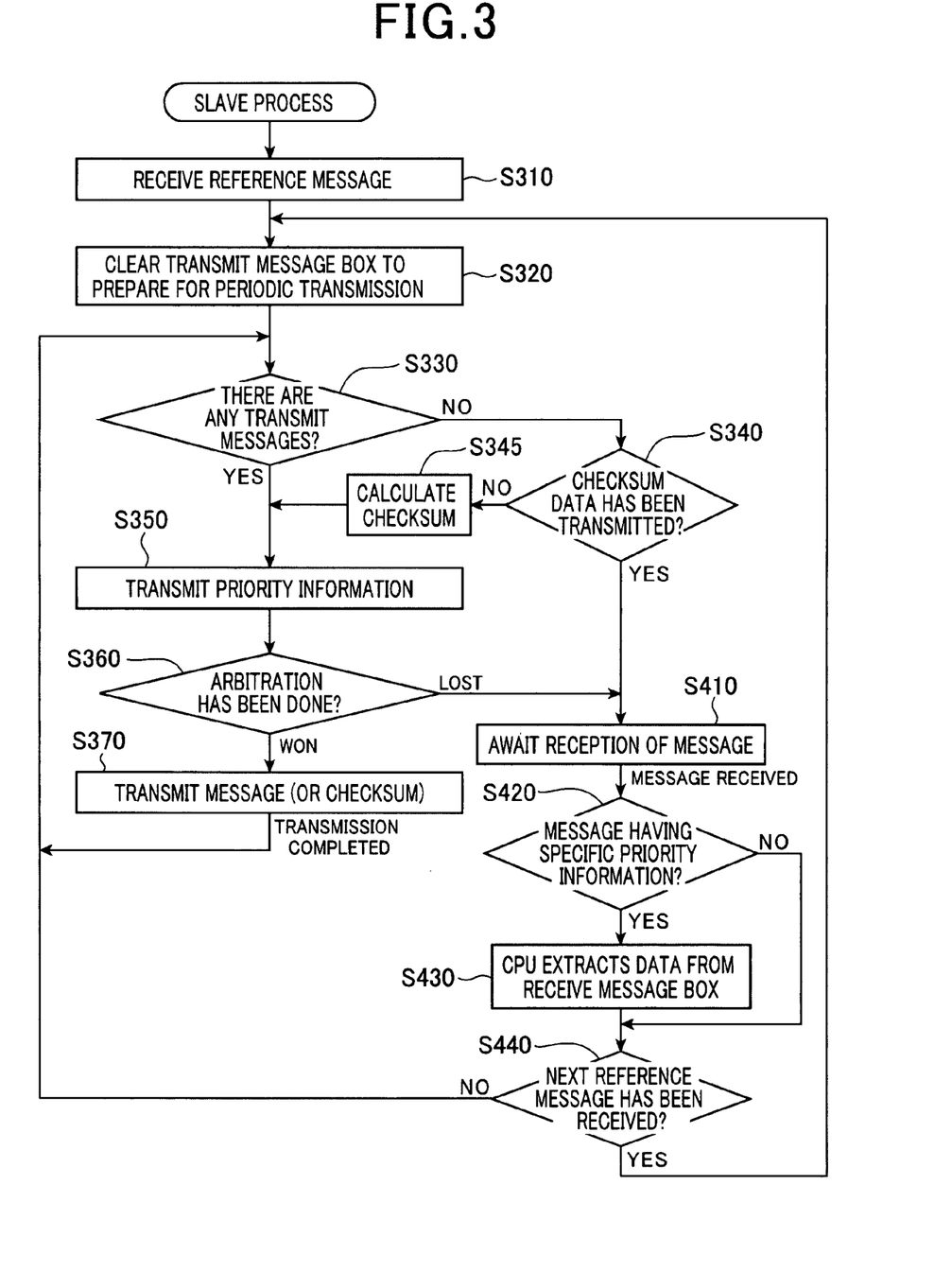
FIG. 3 is a flowchart that schematically illustrates a slave process according to an embodiment of the present invention.

In the following, a process implemented by each of the ECUs 10-30 of the system 1 will be explained with reference to FIGS. 2-10. FIG. 2 is a flowchart illustrating a master process implemented by the controller 13 of the ECU 10 (the master node). FIG. 3 is a flowchart illustrating a slave process implemented by the controller 23, 33 of each of the ECUs 20 and 30 (the slave nodes).

The master and slave processes start with turn on of a vehicle's power supply such as an ignition switch. In the master process, as shown in FIG. 2, a reference message for requiring the slave nodes to send out data is transmitted at step S110.

The master and slave nodes (the ECUs 10-30) receive the reference message, and then, as a general rule, they transmit their message (or messages) on the basis of the reference message.

Then at step S120 its own internal timer is triggered to count up, and at step S130 there is determined, with reference to a count value of the timer, whether a given time period (e.g., 4 ms) has elapsed after the transmission of the reference message. Here, the given time period is set to be longer than a time period which is required for each of the ECUs 10-30 to transmit all its own transmit data one-by-one.

If the given time period has elapsed, the transmit message box in the controller 13 may be cleared (or anticipated data transmission may be cancelled) at step S140, and the process returns to step S110. In other words, the reference message may be retransmitted the given time period after the last transmission of the reference message.

On the other hand, if at step S130 the given time period has not yet elapsed, then at step S150 there is determined whether there are any messages in the transmit message box. If at step S150 there is no message in the transmit message box, then at step S160 it is determined whether checksum data has been transmitted.

As an example, whether the checksum data has been transmitted or not may be determined by a flag. More specifically, the flag may be set upon the transmission of the checksum data at step S190 (which will be described later), and may be reset upon the transmission of the reference message at step S110.

If at step S160 the checksum data has been transmitted, the process proceeds to step S210 which will be described later. If at step S160 the checksum data has not been transmitted yet, then at step S165 there is generated checksum data with respect to a plurality of pieces of data which have been transmitted by the master node itself since the latest transmission of the reference message, and then the process proceeds to step S170.

On the other hand, if at step S150 there exists at least one transmit message in the transmit message box, the process proceeds to step S170 where priority information associated with the transmit message will be transmitted. In particular; when checksum data is to be transmitted, priority information predefined for the checksum data will is be transmitted.

Then the process proceeds to arbitration step (S180) where there is detected whether some priority information transmitted by the other ECUs indicates a higher priority than its own transmitted priority information (i.e., priority information transmitted by the present master node itself). This step may be implemented in a similar manner to the CAN protocol compliant with ISO11898-1.

If at step S180 there is not detected any priority information that indicates a higher priority than its own transmitted priority information, then at step S190 its own transmit message will be transmitted onto the communication bus 5. Then the process returns to step S130. It is here configured that after transmitting the message (checksum data) at step S190, transmission of data of the same priority as the last transmitted message is prohibited until receiving the next reference message.

On the other hand, if at step S180 there is detected some priority information that indicates a higher priority than its own transmitted priority information, then at step S210 reception of the corresponding message from the other ECUs is awaited. Upon reception of the message, there is determined at step S220 whether the received message has specific predefined priority information. If at step S220 this message has the specific priority information, then at step S230 the CPU 12 is instructed to extract data from the receive message box in the controller 13. Then the process proceeds to step S240 which will be described later.

On the other hand, if at step S220 the received message has no such specific priority information, the process immediately moves to step S240 where there is determined whether priority information associated with the received message coincides with the lowest priority information recorded in itself (i.e., in the master node). If so, then at step S250 expiration of the aforementioned given time period after the last transmission of the reference message is awaited. Then the process returns to step S110.

Otherwise, the process returns to step S130. In this case, its own transmit message (as well as its priority information) will be retransmitted after transmit data of the other ECUs has been transmitted.

Next, the slave process will be explained. Let the ECU 20 be representative of the slave nodes ECUs 20 and 30. The following explanation will be focused only on the slave process of the ECU 20. The other slave nodes operate in a similar manner.

The slave process starts with receiving a reference message at step S310. Then at step S320 the transmit message box in the controller 23 is cleared to prepare for periodic transmission of messages.

Then at step S330 there is determined whether there are any messages in the transmit message box. If at step S330 there is no transmit message in the transmit message box, then at step S340 it is determined whether checksum data has been transmitted.

If at step S340 the checksum data has been transmitted, the process proceeds to step S410 which will be described later. If at step S340 the checksum data has not been transmitted yet, then at step S345 there is generated checksum data with respect to a plurality of pieces of data which have been transmitted by the slave node itself since the latest reception of the reference message, and then the process proceeds to step S350.

On the other hand, if at step S330 there exists at least one transmit message in the transmit message box, the process proceeds to step S350 where priority information associated with the transmit message will be transmitted. In particular, when checksum data is to be transmitted, priority information predefined for the checksum data will be transmitted.

Then the process proceeds to arbitration step (S360) where there is detected whether some priority information transmitted by the other ECUs indicates a higher priority than its own transmitted priority information (i.e., priority information transmitted by the present slave node itself). If at step S360 there is not detected any priority information is that indicates a higher priority than its own transmitted priority information, then at step S370 its own transmit message will be transmitted onto the communication bus 5. Then the process returns to step S330. It is here configured that after transmitting the message (checksum data) at step S370, transmission of data of the same priority as the last transmitted message is prohibited until receiving the next reference message.

On the other hand, if at step S360 there is detected some priority information that indicates a higher priority than its own transmitted priority information, then at step S410 reception of the corresponding message from the other ECUs is awaited. Upon reception of the message, it is determined at step S420 whether the received message has specific predefined priority information. If at step S420 this message has the specific priority information, then at step S430 the CPU 22 is instructed to extract data from the receive message box in the controller 23. Then the process proceeds to step S440 which will be described later.

On the other hand, if at step S420 the received message has no such specific priority information, the process immediately moves to step S440 where there is determined whether the next reference message has been received. If so, then the process returns to step S320. Otherwise, the process returns to step S330.

Figure 4:
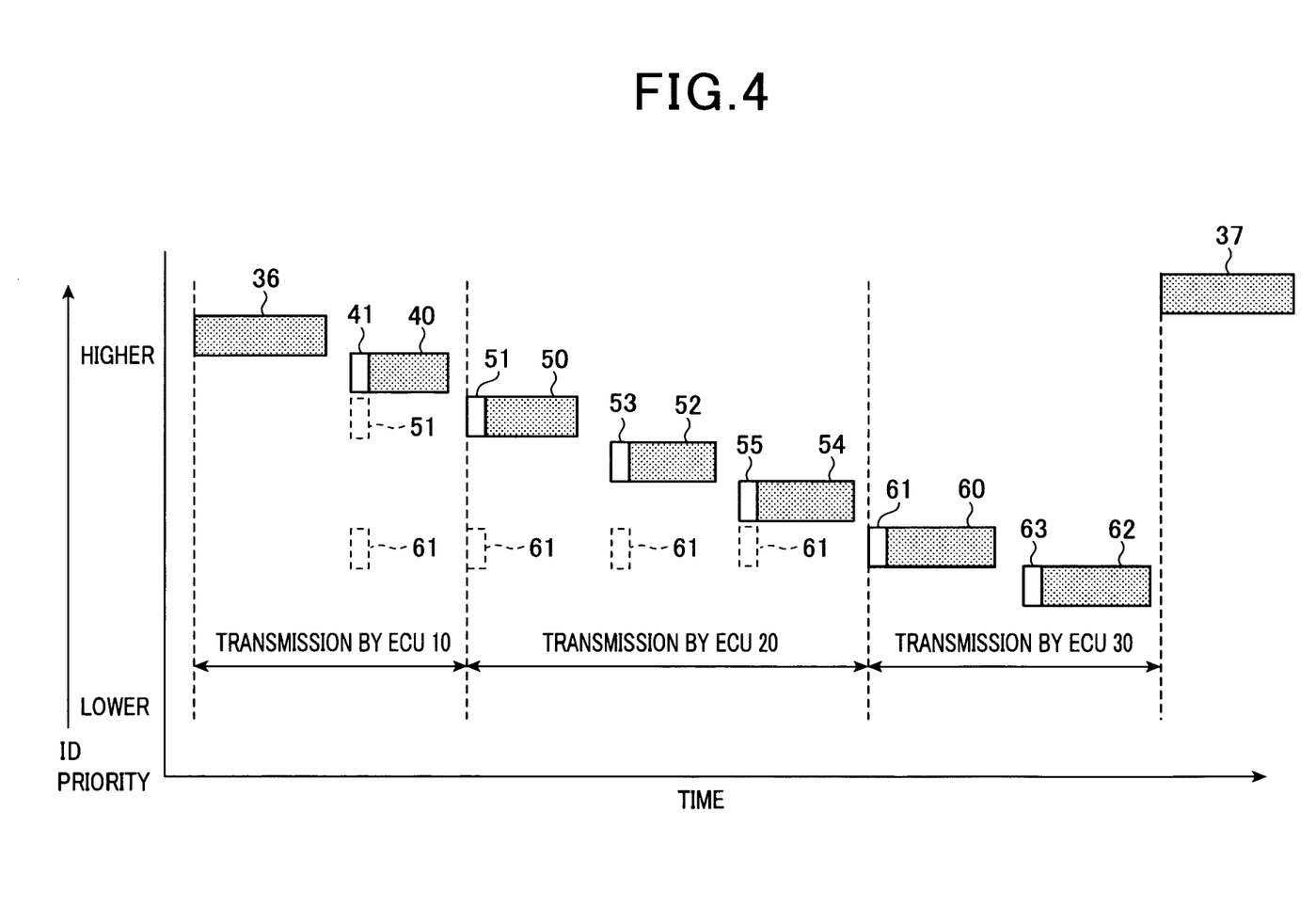
FIG. 4 is an exemplary scenario where each ECU actually transmits data.
Figure 5:
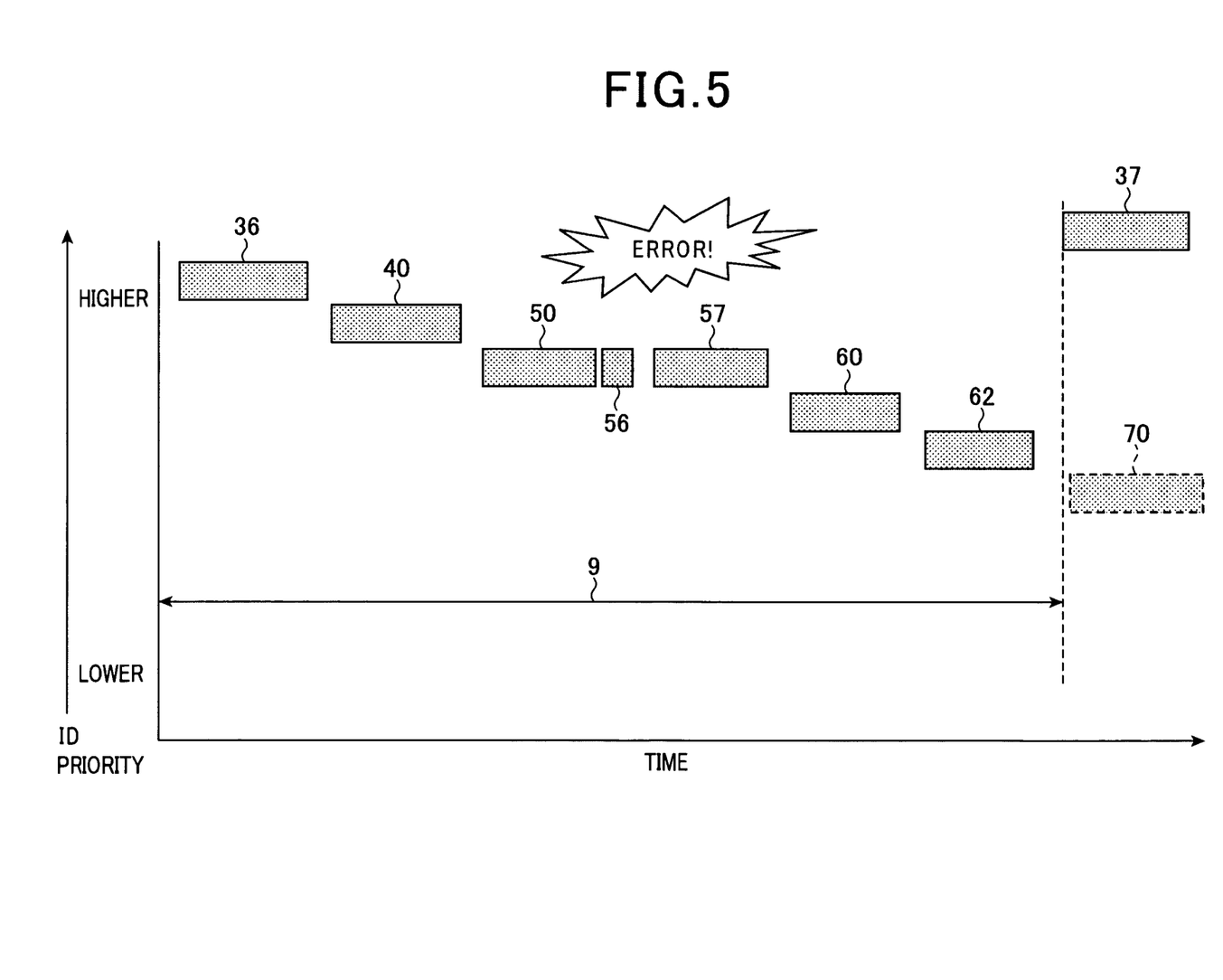
FIG. 5 is a further exemplary scenario where each ECU actually transmits data.

There now will be explained exemplary scenarios where the ECUs 10-30 that implement the above master and slave processes actually transmit data with reference to FIGS. 4 and 5. FIGS. 4 and 5 show a relationship between time (horizontal line) and priority information (vertical line).

As shown in FIG. 4, the ECU 10 transmits a reference message 36. Then the ECUs 10-30 transmit their respective priority information 41, 51, 61 simultaneously a predetermined number of bits (e.g., three bits) after they have received the reference message from the ECU 10.

In such a case, an arbitration process may be implemented for resolving the contention of these competing priority information 41, 51, 61. As a result of the arbitration process, only a message 40 associated with the highest priority information 41 transmitted by the ECU 10 is permitted to be transmitted. And then the ECUs 10-30 retransmit their respective priority information 51, 61 simultaneously the predetermined number of bits (e.g., three bits) after the message 40 has been transmitted. This time only a message 50 of the ECU 20 associated with the highest priority information 51 is permitted to be transmitted. After that, messages 52, 54, 60, 62 will be transmitted successively by repeating the above procedure.

It should be noted that in the scenario shown in FIG. 4, the priority information 41 of the ECU 10 is set to be higher than the priority information 51, 53, 55 of the ECU 20 and the priority information 61, 63 of the ECU 30, and that the priority information 51, 53, 55 of the ECU 20 is set to be higher than the priority information 61, 63 of the ECU 30.

Therefore, the ECU 20 will transmit its own message after the ECU 10 has transmitted all its own message or messages. Then the ECU 30 will transmit its own message after the ECU 20 has transmitted all its own message or messages.

After the message 62 associated with the lowest priority information 63 has been transmitted, the next reference message 37 will be transmitted by the ECU 10. Again, transmission of all the transmit messages of the ECUs 10-30 will be implemented by repeating the above procedure.

In case of occurrence of an error during the message transmission, a following process may be implemented, as shown in FIG. 5. As an example, suppose here that an error has occurred during transmission of the message 50 and that a corresponding error message 56 has been sent out from some other ECUs or the error has been detected by the ECU itself that has transmitted the message 50. In such a case, the message 50 will be retransmitted (see the retransmitted message 57 in FIG. 5). Even if such an error frequently occurs, the reference message 37 will be retransmitted after a given time period 9 (referred here to as a "reset reference time period") has elapsed. It should be noted that the reference messages 36, 37 are set to be higher in priority than normal transmit messages.

In the system 1 according to the embodiment of the present invention as elaborated above, the controller 13 of the ECU 10 that acts as a master node transmits a reference message for requiring the other ECUs 20 and 30 that act as slave nodes to transmit data. Then, upon reception of the reference message, each controller 13(, 23, 33) of respective ECUs 10-30 (specific nodes) transmits priority information that indicates a priority of its own transmit message onto the communication bus 5, and then detects whether some priority information transmitted from the other ECUs indicates a higher priority than its own transmitted priority information.

In addition, each of ECUs 10, 20 and 30 transmits a message onto the communication bus 5 if there is detected no priority information that indicates a higher priority than its own transmitted priority information, and then transmission of data of the same priority as its own last transmitted message is prohibited until receiving the next reference message. If there is detected some priority information that indicates a higher priority than its own transmitted priority information, its own priority information will be retransmitted after a message associated with the detected higher priority information has been transmitted from the corresponding other ECU.

In summary, in the system 1 according to the embodiment of the present invention as described above, the ECUs 10-30 start their message transmission on the basis of the reference message. Only the message associated with the highest priority information may be transmitted onto the communication bus 5. Since each ECU 10(-30) is prohibited to transmit a message (or messages) of the same priority as its own last transmitted message until receiving the next reference message, it will successively transmit their messages in descending order of priority.

Therefore, a message, even if it has a lower priority, will be transmitted after all the messages of a relatively higher priority have been transmitted. Also, the system 1 of the present invention can continue communication with an optimal time interval between successive message transmissions.

Thus, the system 1 according to the embodiment of the present invention as described above can increase a transmission frequency of such messages that would have a lower priority and a lower transmission frequency in the conventional communication systems and can improve usage efficiency of the communication bus 5.

Since the system 1 uses a similar communication protocol to the CAN protocol, it is not required to manage message transmission in a time-division manner, which facilitates design modification when adding another ECU to the communication bus 5. In addition, each ECU is not required to transmit messages at a precisely defined time interval as in a fixed-timeslot system such as FlexRay®, which makes it unnecessary to use a high-precision time management technology (a high-accuracy clock and a timing counter).

The ECU 10 that acts as a master node is storing the lowest priority information that indicates the lowest priority among priority information to be transmitted by the individual ECUs 10-30. Upon having received the lowest priority information, the ECU 10 retransmits the reference message next to the message associated with the lowest priority information from the corresponding ECU.

In the system 1 as described above, all the transmit messages may be attempted to be transmitted again after the message associated with the lowest priority information has been transmitted. In addition, once a reset reference time period set to be longer than a time period required for the individual ECUs 10-30 to sequentially transmit all their own transmit data has elapsed after the previous transmission of the reference message, the ECU 10, here the master node, retransmits the reference message.

In the system 1 as described above, since the reference message is set to be retransmitted each time the reset reference time period has elapsed, each ECU 10(-30) may approximately periodically transmit a same kind of its own messages one by one.

In addition, each ECU 10(-30) may detect whether some error has occurred during its message transmission. In case an error has been detected, the ECU that failed to transmit a message may retransmit the message as well as priority information associated therewith.

In the above system 1, even in case such a message error frequently occurs and thus retransmission of the message frequently occurs, since the reference message will be retransmitted after the reset reference time period has elapsed, messages of a higher priority can be sequentially transmitted almost at a time interval of the reset time period. Optionally, retransmission of the message that failed to be transmitted may be prohibited.

Moreover, in the system 1 as described above, once the reset reference time period has elapsed after the latest transmission of the reference message, each ECU 10(-30) may delete its own transmit message (or messages) in its own transmit buffer.

In the above system 1, since a message in the transmit buffer is permitted to be transmitted only within the reset reference time period, it is possible to prevent such an old message that has resided in the transmit buffer for a longer time period from being transmitted.

In addition, in the system 1 as described above, upon receiving read reference information which is predefined priority information, at least one of the ECUs 10-30 may issue an acquisition instruction for acquiring a message from the receive buffer for storing messages received via the communication bus 5.

In the above system 1, since the acquisition instruction is issued upon reception of the read reference information, a frequency for the CPU 12, 22, 32 on the message-acquiring side to acquire a message (or messages) can be reduced compared to the conventional configuration where the acquisition instruction is issued each time a message is received. As a result, the processing load on the message-acquiring side can be reduced.

In addition, in the system 1 as described above, each of the ECUs 10-30 may generate checksum data with respective to a plurality of messages it has transmitted, and then transmits priority information predefined for the generated checksum data as well as the generated checksum data. In some embodiments, each of the ECUs 10-30 may generate the checksum data after it has transmitted its own predefined transmit messages (all its transmit messages in the present embodiment).

In the above system 1, the ECU 10-30 that has received the checksum data can detect whether an error has occurred during transmission of a plurality of messages based on only one piece of checksum data. Also, in the present system 1, once a predetermined message, e.g., all its own transmit messages, has been transmitted, there may be transmitted checksum data with respect to messages that have been transmitted so far.

Further Embodiments

It is to be understood that the present invention is not to be limited to the specific embodiments disclosed and that modifications and other embodiments are intended to be included within the scope of the appended claims.

Figure 6:
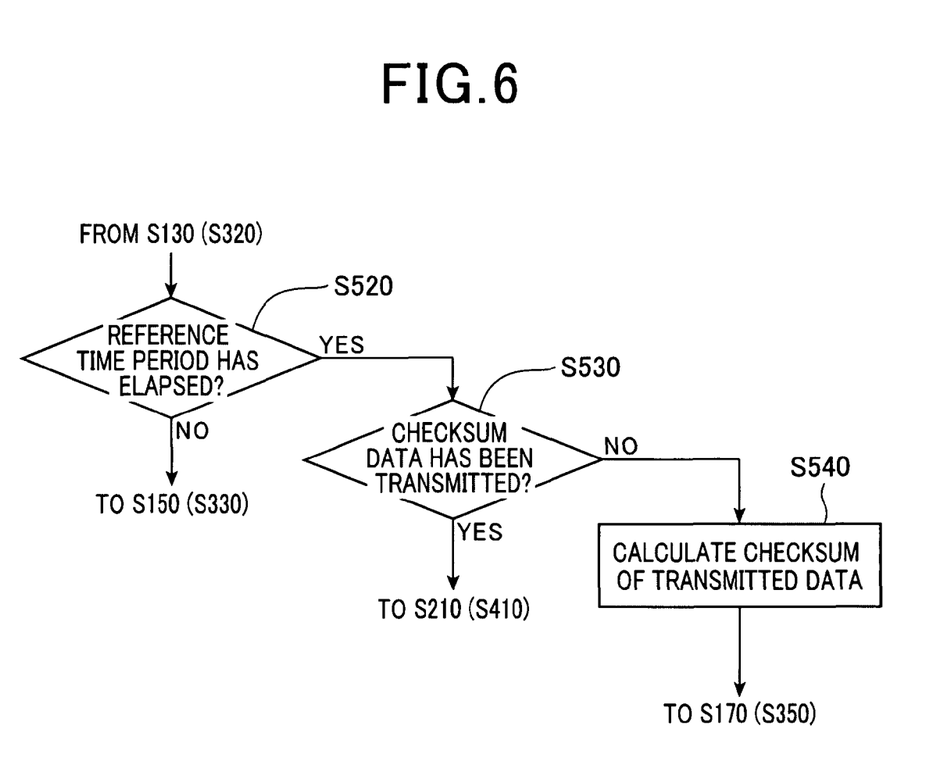
FIG. 6 is a flowchart that schematically illustrates a master (or slave) process according to a further embodiment of the present invention.

According to a further embodiment of the present invention, the following steps may be added to the master and slave processes. Specifically, as shown in FIG. 6, the step S520 may be added between steps S130 and S150 of the master process, where there is determined whether a reference time period (e.g., 3.8 ms) set to be shorter than the predetermined given time period described above (i.e., a time period between successive reference message transmissions) has elapsed. Instead or in addition, this step may be added between the steps S320 and S330 of the slave process.

In case the step S520 is added to the slave process, the step S520 may also be implemented after step S370 or after a negative judgement at step S440. And in the slave process, an internal timer may be triggered to count up upon reception of the reference message, and the step S520 may be implemented with reference to its count value.

If at step S520 the reference time period has not elapsed yet, the master process proceeds to step S150 or the slave process proceeds to step S330. If at step S520 the reference time period has elapsed, then at step S530 it is determined whether checksum data has been transmitted.

If at step S530 the checksum data has been transmitted, the master process proceeds to step S210 or the slave process proceeds to step S410. On the other hand, if at step S530 the checksum data has not been transmitted yet, then at step S540 there is generated checksum data with respect to own transmitted messages, and then the master process proceeds to step S170 or the slave process proceeds to step S350.

Figure 7:
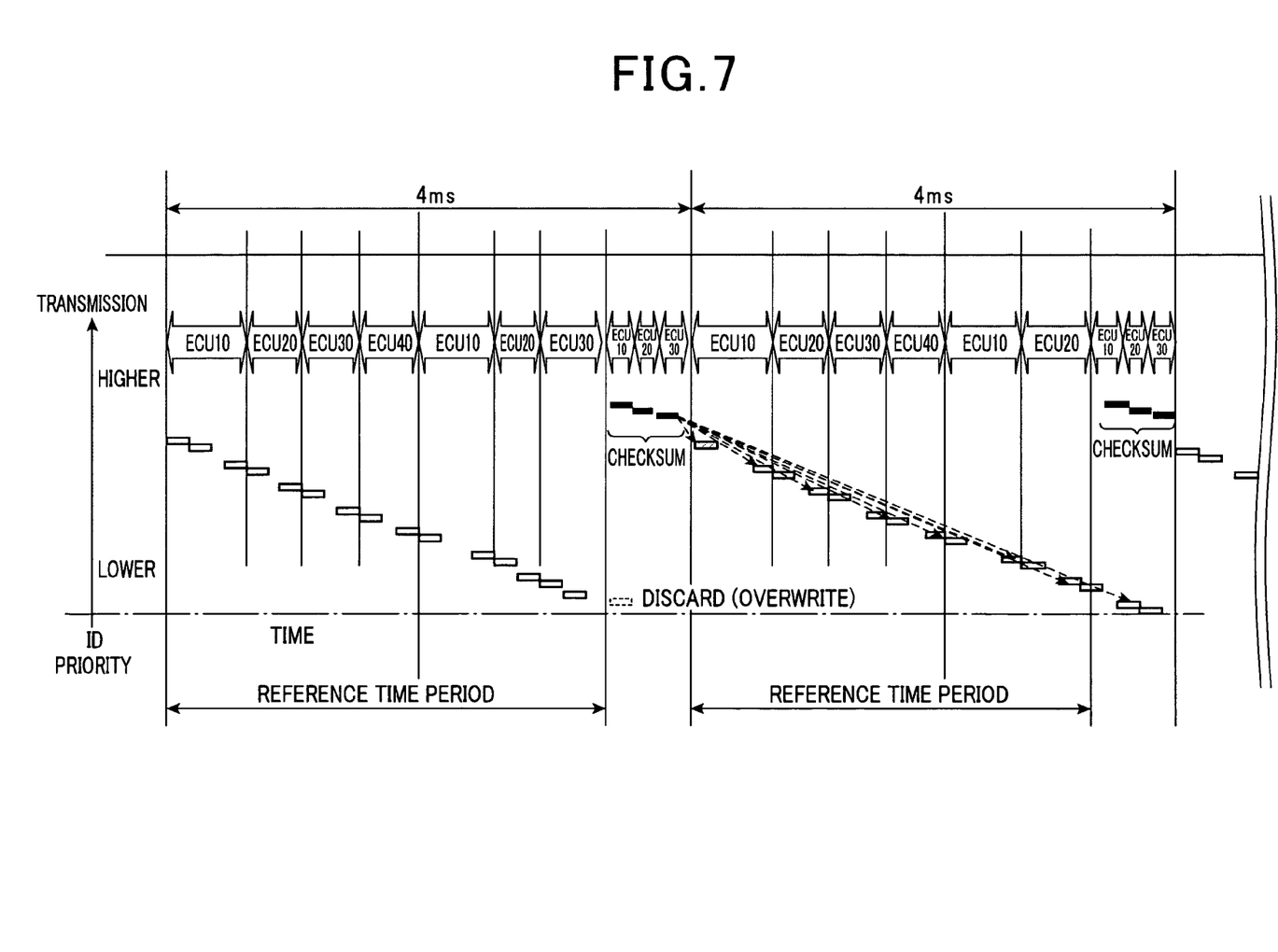
FIG. 7 is a further exemplary scenario where each ECU actually transmits data.

In case each ECU 10(-30) implements such additional steps, once the reference time period has elapsed after the latest transmission of the reference message, the checksum data will be transmitted from it, as shown in FIG. 7. Then the priority information of the checksum data may be set to be higher than normal transmit messages of the ECUs 10-30 to thereby win any arbitration with such messages.

Therefore, since even if the next reference message is transmitted before completion of transmission of all the transmit messages, the checksum data can be transmitted therebefore (i.e., before transmission of such the next reference message). This enables reliability of the already transmitted messages to improve.

Figure 8:
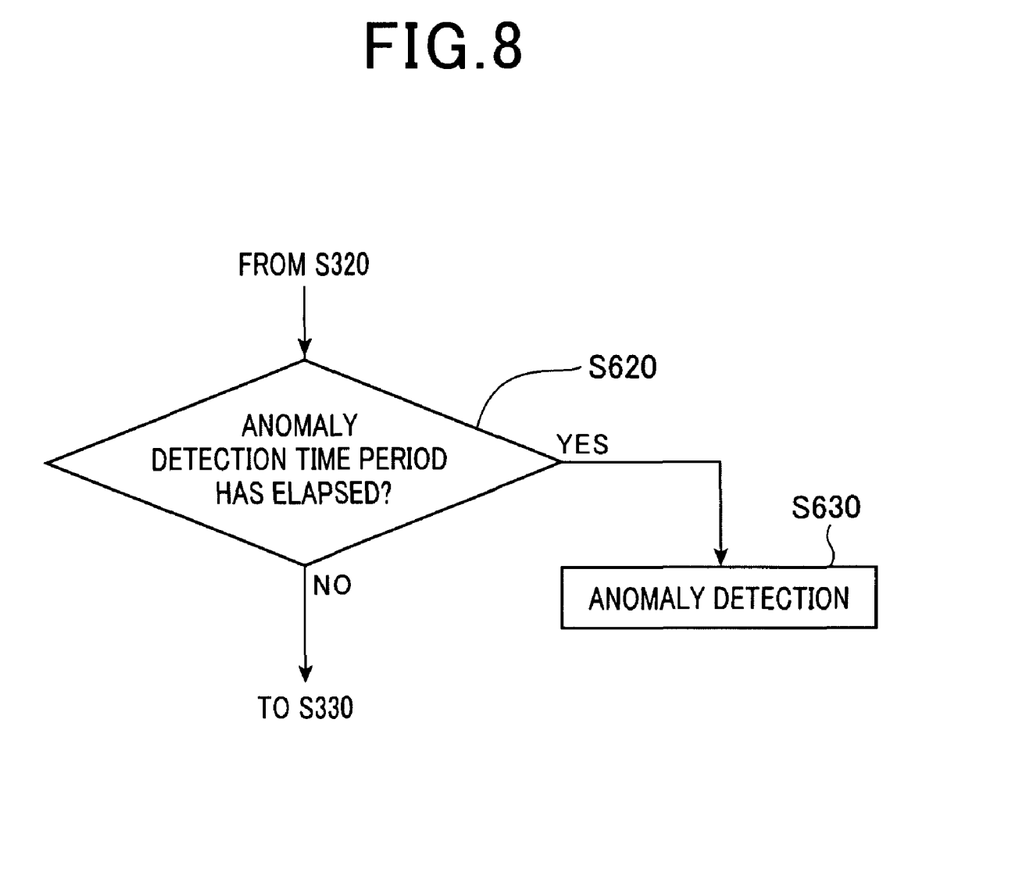
FIG. 8 is a flowchart that schematically illustrates a slave process according to a further embodiment of the present invention.

As for the slave process, the following steps as shown in FIG. 8 may be implemented instead of steps S520-S540 or may be added between steps S520 and S330. Specifically, a timer configured to be reset upon reception of the reference message is triggered to operate in advance. After step S320, there is determined at step S620 whether an anomaly detection time period set to be longer than the aforementioned given time period (i.e., a time period between successive reference message transmissions) described above has elapsed.

If at step S620 the anomaly detection time period has not elapsed yet, it can be recognized that no anomaly exists. Then the process proceeds to step S330. On the other hand, if at step S620 the anomaly detection time period has elapsed, then at step S630 it can be recognized that some anomaly exists.

Figure 9:
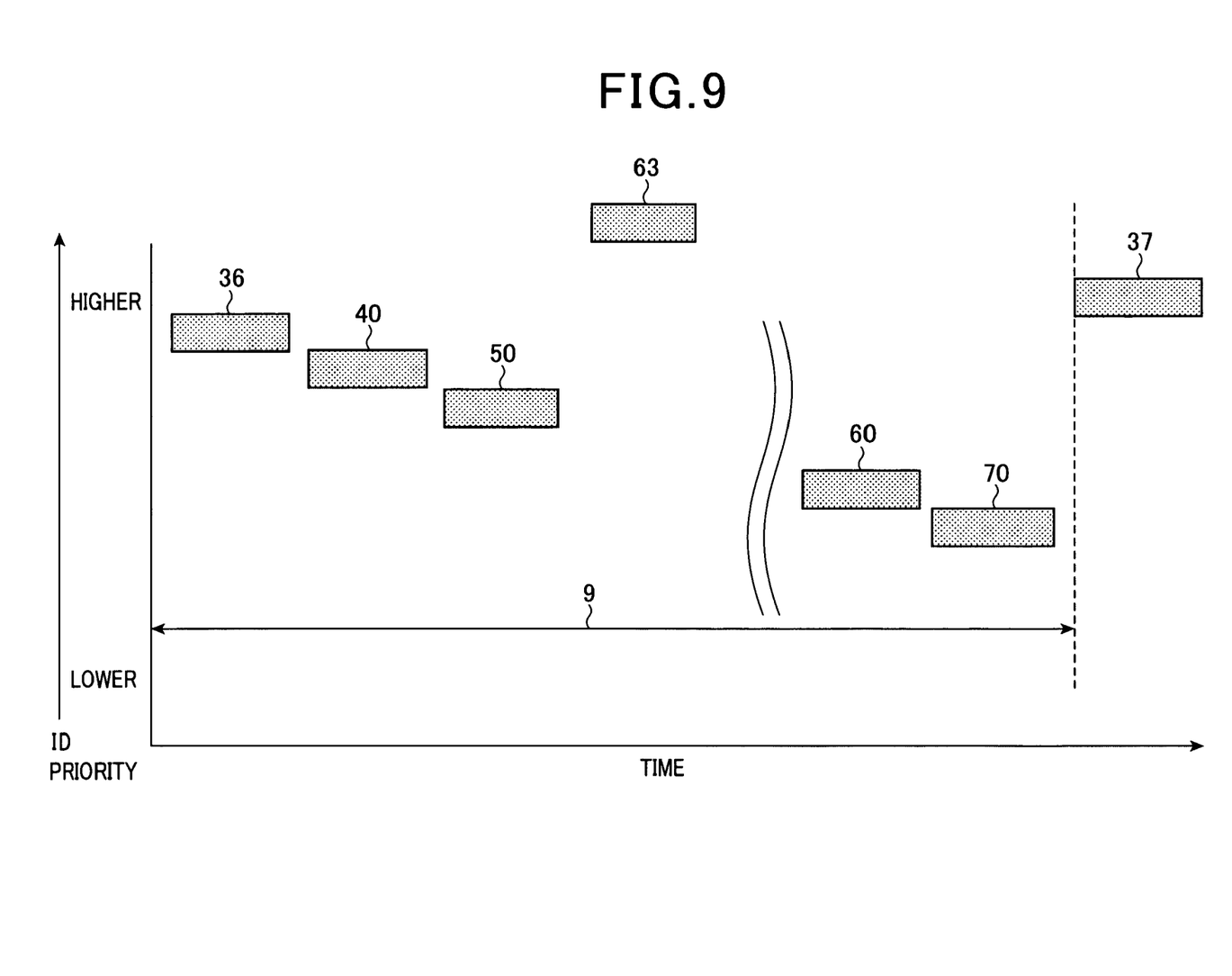
FIG. 9 is a further exemplary scenario where each ECU actually transmits data.

In the latter case, as an example, as shown in FIG. 9, an anomaly notice message 63 of a higher priority than normal transmit messages may be transmitted. This configuration enables a slave node to detect an anomaly that the master node has failed to periodically transmit the reference messages.

Figure 10:
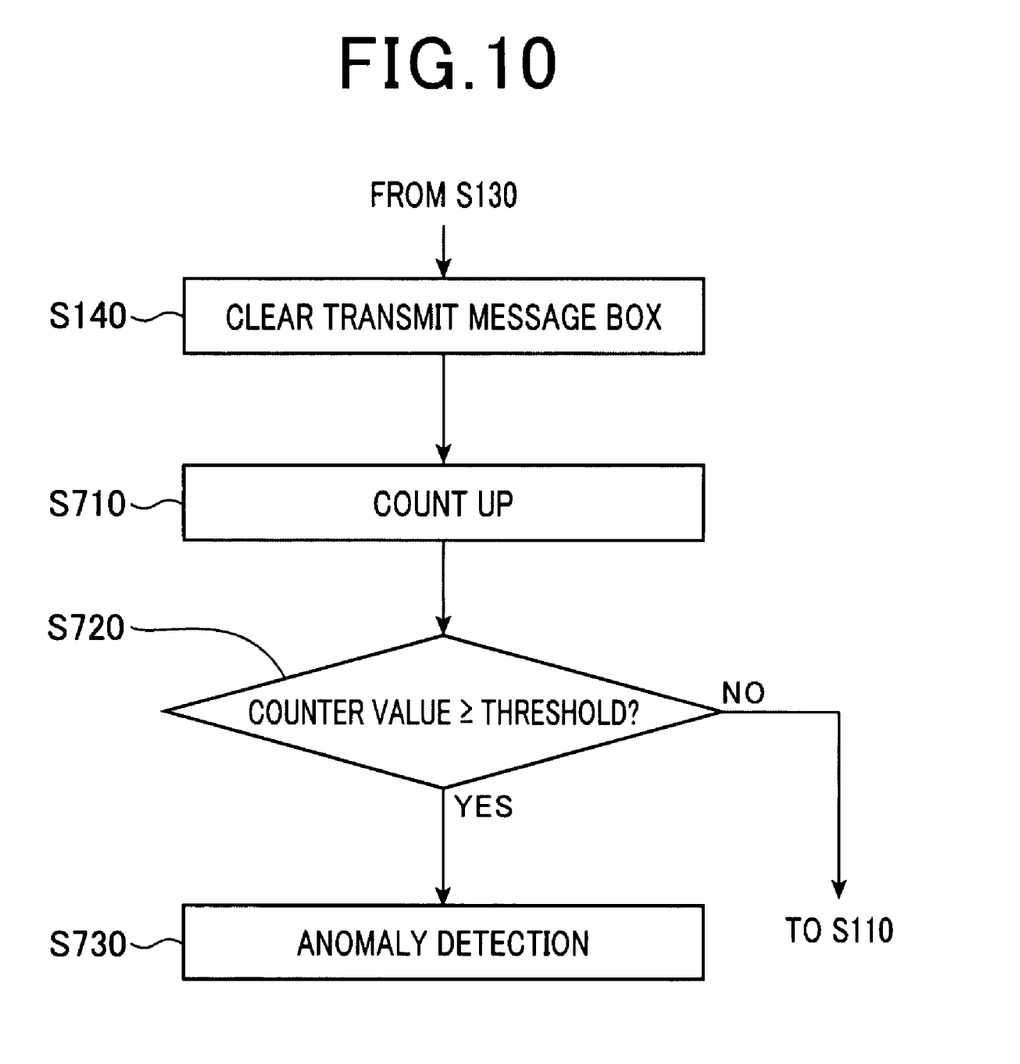
FIG. 10 is a flowchart that schematically illustrates a master process according to a further embodiment of the present invention.

In the master process, if at step S130 an affirmative judgement is made (i.e., "YES" at step S130 in FIG. 2), the following steps as shown in FIG. 10 may be implemented. Specifically, if at step S130 an affirmative judgement is made, then at step S140 the transmit message box in the controller 13 is cleared and at step S710 an anomaly detection counter is triggered to count up (or increment). Then at step S720, a judgement is made to its counter value.

If at step S720 the counter value is below a predetermined threshold, the process returns to step S110. On the other hand, if at step S720 the counter value is equal to or above the threshold, then at step S730 it can be recognized that some anomaly exists.

It should be noted that steps S710-730 correspond to the means for if the lowest priority information has not been detected for a second predetermined anomaly detection reference time period or more, transmitting an anomaly notice indicative of an anomaly, as in the appended claims. This configuration enables an anomaly to be recognized in case a message of the lowest priority frequently fails to be transmitted due to frequent errors. In case a message having the lowest priority information has been transmitted (as in step S250), the anomaly detection counter may be reset.

In the embodiments described above, the ECUs 10-30 connected to the communication bus 5 have been configured to transmit their own message (or messages) upon reception of the reference message. In a further embodiment, there may be connected to the communication bus 5 an additional ECU which transmits data (e.g., periodically) whether or not it has received the reference message.

Moreover, the ECU may be configured to output priority information which is higher in priority than others, if there occur emergency cases such as a case where it is necessary to immediately actuate on-vehicle air bags.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A communication system configured by connecting a plurality of communication nodes to a communication bus, the communication nodes being able to detect data transmitted to the communication bus, wherein:

one communication node among the plurality of communication nodes, predetermined as a master node, comprises:

reference transmitting means for repeatedly transmitting a reference message to other communication nodes to request transmission of their data, and one or more communication nodes among the plurality of communication nodes, predetermined as specific nodes, wherein each specific node comprises:

priority transmitting means for transmitting, to the communication bus, priority information of transmission data to be transmitted currently from that specific node upon reception of the reference message transmitted from the master node, the priority information being indicative of priority of the transmission data for that specific node;

priority detecting means for detecting whether the priority information transmitted from the other communication nodes indicates higher priority than the priority information transmitted by itself;

data transmitting means for, if the priority information indicative of higher priority than the priority information transmitted by itself is not detected by the priority detecting means, transmitting the transmission data to the communication bus, and stopping transmission of data of the same priority as the priority of the data transmitted by itself until a next instance of the reference message is received; and priority retransmitting means for, if the priority information indicative of higher priority than the priority information transmitted by itself is detected by the priority detecting means, allowing the priority transmitting means to retransmit the priority information during a period of time of waiting for reception of the next reference message, after transmission data is transmitted to the communication bus from another communication node to which the priority information detected by the priority detecting means corresponds.

2. The communication system according to claim 1, wherein:

the master node is configured to store in itself the lowest order information that is priority information having a lowest priority among priority information to be transmitted from the individual specific nodes; and the reference transmitting means is configured to transmit, when the master node receives the lowest order information, the reference message as data subsequent to the transmission data transmitted from the specific node corresponding to the lowest order information.

3. The communication system according to claim 2, wherein:

the reference transmitting means, after transmission of a reference message, again transmits a reference message once a reset reference time period has elapsed, the reset reference time period being set to be longer than a time period required for the individual specific nodes to sequentially transmit all the transmission data.

4. The communication system according to claim 3, wherein:

each of the specific nodes comprises:

transmission data deleting means for deleting, once a reference message has been transmitted from the master node, transmission data stored in a transmission buffer prior to transmission of the transmission data to be transmitted by itself, after the elapse of the reset reference time period.

5. The communication system according to claim 1, wherein:

at least any of the communication nodes comprises:

acquisition instruction outputting means for, upon reception of read reference information that is predetermined priority information, outputting an acquisition instruction to acquire data in a reception buffer that stores data received via the communication bus.

6. The communication system according to claim 1, wherein:

each of the specific nodes comprises:

checksum generating means for generating checksum data associated with a plurality of transmission data transmitted by itself; and checksum transmitting means for transmitting priority information predetermined according to the generated checksum data and transmitting the checksum data.

7. The communication system according to claim 6, wherein:

the checksum generating means is configured to generate the checksum data upon transmission of predetermined transmission data from among transmission data to be transmitted by the specific node of its own.

8. The communication system according to claim 6, wherein:

the checksum generating means is configured to generate the checksum data each time a predetermined checksum reference time period has elapsed.

9. The communication system according to claim 1, wherein:

at least one of the specific nodes comprises:

a first anomaly outputting means for outputting an anomaly of the master node when a predetermined first anomaly determining reference time period or more has elapsed from when the master node has transmitted the last reference message.

10. The communication system according to claim 1, wherein:

at least one of the specific nodes:

is configured to store in itself the lowest order information that is priority information having the lowest priority among priority information transmitted from the individual specific nodes; and comprises a second anomaly outputting means for outputting an anomaly when the lowest order information has not been detected for a predetermined second anomaly determining reference time period or more.

11. The communication system according to claim 2, wherein:

the reference transmitting means, after transmission of a reference message, is configured to again transmit a reference message once a reset reference time period has elapsed, the reset reference time period being set to be longer than a time period required for the individual specific nodes to sequentially transmit all the transmission data.

12. The communication system according to claim 11, wherein:
each of the specific nodes comprises:
transmission data deleting means for deleting, once a reference message has been transmitted from the master node, deleting transmission data stored in a transmission buffer prior to transmission of the transmission data to be transmitted by itself, after the elapse of the reset reference time period.

13. The communication system according to claim 12, wherein:
at least any of the communication nodes comprises:
acquisition instruction outputting means for, upon reception of read reference information that is predetermined priority information, outputting an acquisition instruction to acquire data in a reception buffer that stores data received via the communication bus.

14. The communication system according to 13, wherein:
each of the specific nodes comprises:
checksum generating means for generating checksum data associated with a plurality of transmission data transmitted by itself; and
checksum transmitting means for transmitting priority information predetermined according to the generated checksum data and transmitting the checksum data.

15. The communication system according to claim 14, wherein:
the checksum generating means is configured to generate the checksum data upon transmission of predetermined transmission data from among transmission data to be transmitted by the specific node of its own.

16. The communication system according to claim 14, wherein:
the checksum generating means is configured to generate the checksum data each time a predetermined checksum reference time period has elapsed.

17. A communication node which is able to detect data transmitted to a communication bus, wherein:
the communication node is configured as a master node that configures the communication system set forth in claim 2.

18. The communication node which is able to detect data transmitted to a communication bus, wherein:
the communication node is configured as a specific node that configures the communication system set forth in claim 2.

* * * * *